No. 810,538. PATENTED JAN. 23, 1906.
E. B. JELKS.
SPATULA AND CORK EXTRACTOR.
APPLICATION FILED APR. 11, 1905.
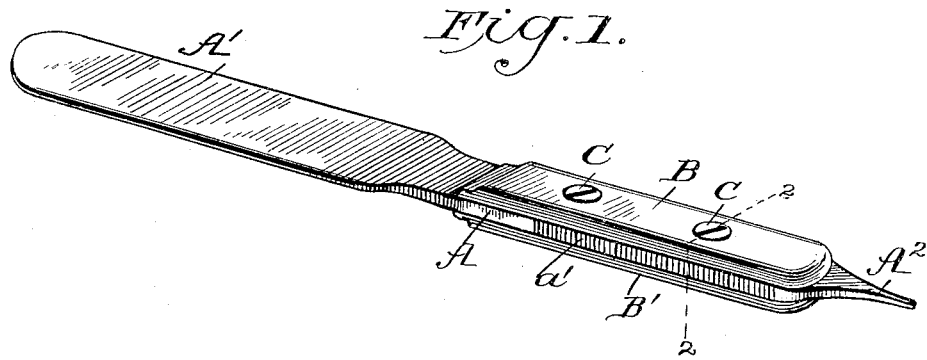
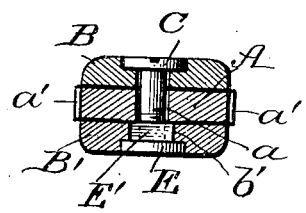
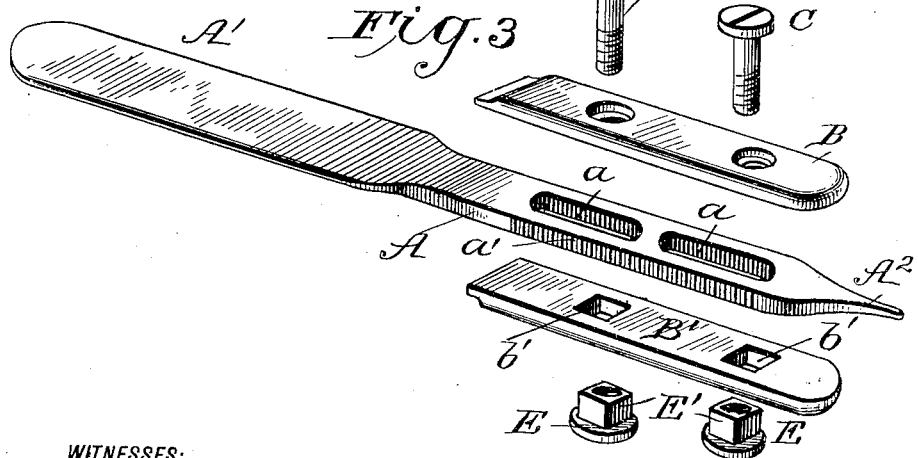
WITNESSES:
Jos. A. Ryan.
Perry B. Turpin.
INVENTOR
Edwin B. Jelks
BY Munn & Co.
ATTORNEYS

UNITED STATES PATENT OFFICE.

EDWIN BRIGGS JELKS, OF QUITMAN, GEORGIA.

SPATULA AND CORK-EXTRACTOR.

No. 810,538.     Specification of Letters Patent.     Patented Jan. 23, 1906.

Application filed April 11, 1905. Serial No. 255,051.

*To all whom it may concern:*

Be it known that I, EDWIN BRIGGS JELKS, a citizen of the United States, and a resident of Quitman, in the county of Brooks and State of Georgia, have invented certain new and useful Improvements in Spatulas and Cork-Extractors, of which the following is a specification.

My invention is an improvement in spatulas, having for an object to provide a novel construction of combined spatula and cork-extractor; and the invention consists in certain novel constructions and combinations of parts, as will be hereinafter described and claimed.

In the drawings, Figure 1 is a perspective view of a spatula embodying my invention. Fig. 2 is a cross-section on about line 2 2 of Fig. 1, and Fig. 3 is a detail perspective view illustrating the different parts detached.

My spatula consists, as shown, of the blade A, the handle-sections B, the screws C, and the nuts E. The blade A is adapted at one end A' for use as a spatula and is pointed at its other end at $A^2$ to serve as a cork-extractor and is movable longitudinally between the handle-sections B and B' to cause the cork-extractor $A^2$ to protrude from the butt-end of the handle for use as a cork-extractor. As shown in Fig. 1, it may be operated to incase the said pointed end $A^2$ within the handle, as will be understood from the drawings. To this end the blade A is slotted longitudinally at *a* for the passage of the screws C, so the handle-sections and blade may be moved relatively in a longitudinal direction to secure the incasing or projection of the cork-extractor $A^2$, as desired. As shown, the screws C turn in one handle-section B and thread into threaded bearings in the opposite handle-section B'. As shown, the threaded bearings are provided in nuts E, having angular portions E' fitting angular openings *b*' in the handle-section B'. By tightening these screws the blade may be clamped between the handle-sections, and by releasing them I am able to secure the adjustment of the blade, as before described. As best shown in Figs. 1 and 2, the blade has its intermediate portion between the spatula A', and the cork-extractor $A^2$ of a width to project slightly beyond the opposite sides of the handle-sections B and B', and these projecting sides of the blade are preferably milled or roughened, as shown at *a*', so that in grasping the handle the operator will also grasp the blade in such manner as to hold the blade rigid from longitudinal movement between the handle-sections, so that in use the operator can quickly adjust the blade from one position to the other by having the screws slightly loose so it is not necessary to tighten or release the screws at each operation of the device, as the grasp of the hand tightens the handle-sections upon the blade and the gripping of the roughened projecting edges of the blade will secure the parts rigidly together.

Having thus described my invention, what I claim as new, and desire to secure by Letters Patent, is—

1. The combined spatula and cork-extractor herein described comprising the blade adapted at one end to form a spatula and having its other end forming a cork-extractor, and having its intermediate portion roughened or milled at its edges, the handle-sections lapping upon the opposite sides of the intermediate portion of the blade, the latter projecting laterally beyond the edges of the handle-sections to be grasped by the hand, and devices connecting the handle-sections and the handle-sections and the blade being movable relatively in a longitudinal direction whereby the cork-extractor may be incased between the handle-sections or projected therefrom, substantially as set forth.

2. The combination of the handle-sections, the blade having the spatula at one end, the cork-extractor at the opposite end, an intermediate portion roughened at its edges and slotted longitudinally in said intermediate portion, the handle-sections lapping on opposite sides of the intermediate portion of the blade and made narrower than the said intermediate portion whereby the roughened edges may project beyond the handle-sections, and screws connecting the handle-sections, and extending through the slots in the blade whereby the handle-sections and the blade are movable relatively in a longitudinal direction, substantially as described.

3. The combination with two oppositelydisposed handle-sections of, the blade movable longitudinally between the same and made of a width exceeding that of the handle-sections whereby the longitudinal side edges of the blade will project laterally beyond the handle to form handholds for use in adjusting the blade longitudinally relative to the handle-sections, substantially as, and for the purpose set forth.

EDWIN BRIGGS JELKS.

Witnesses:
C. M. QUARTERMAN,
O. K. JELKS.